No. 833,300. PATENTED OCT. 16, 1906.
A. G. CAMERON.
COMBINED EXCAVATOR AND CONVEYER.
APPLICATION FILED JUNE 25, 1906.
2 SHEETS—SHEET 2.
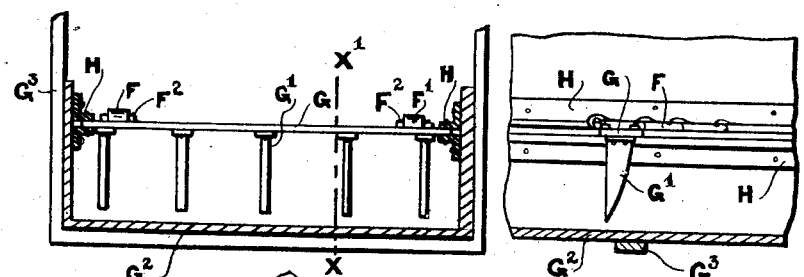
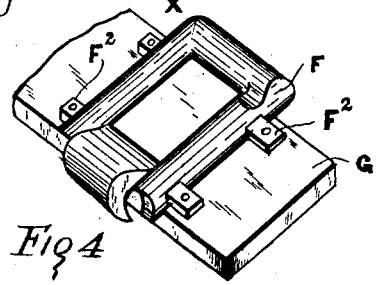
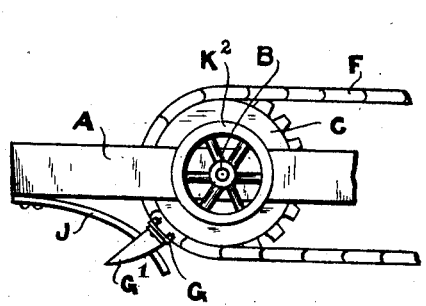
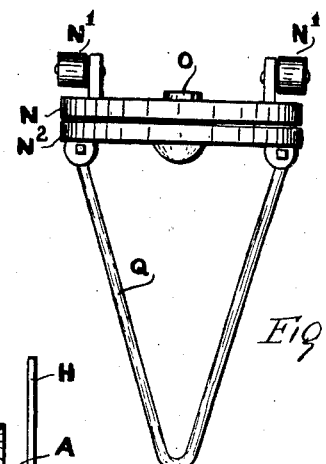
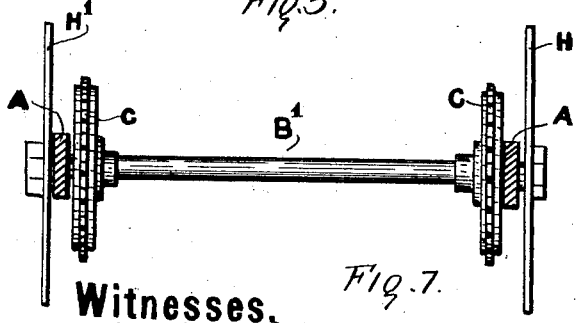
Witnesses
Inventor
Alex G. Cameron
By
Fred B. Fahrenstock
His Atty.

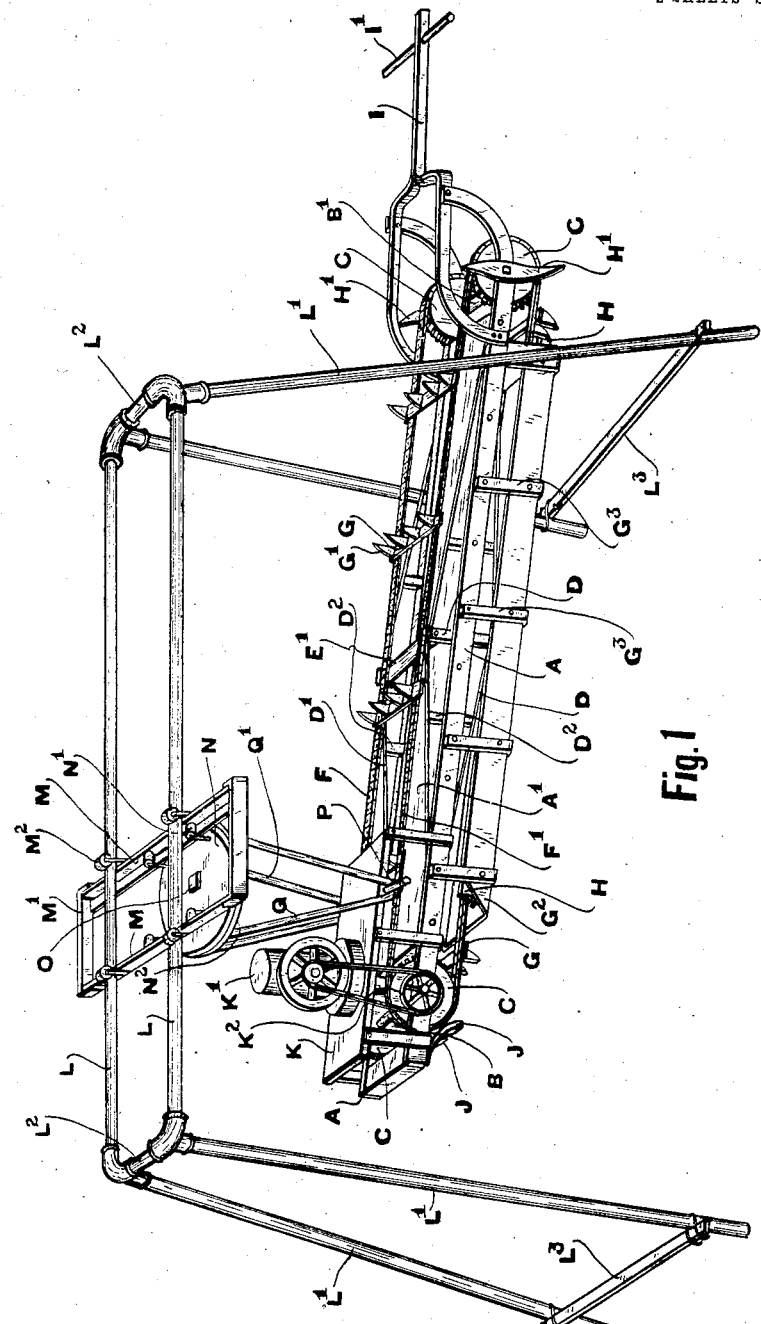

UNITED STATES PATENT OFFICE.

ALEXANDER G. CAMERON, OF WINNIPEG, MANITOBA, CANADA.

COMBINED EXCAVATOR AND CONVEYER.

No. 833,300.          Specification of Letters Patent.          Patented Oct. 16, 1906.

Application filed June 25, 1906. Serial No. 323,398.

*To all whom it may concern:*

Be it known that I, ALEXANDER G. CAMERON, builder, of the city of Winnipeg, in the Province of Manitoba, Canada, have invented certain new and useful Improvements in a Combined Excavator and Conveyer, of which the following is a specification.

My invention relates to improvements in combined excavators and conveyers; and the object of the invention is to provide a light, strong, convenient, and efficient machine which is more especially adapted to the digging and handling of loose earth direct from the cut to a wagon or other such like vehicle.

Further objects of the invention are to devise an excavator which may be run to any position and remain completely under the control of a single operator and also to avoid the necessary limitation of the cut as occasioned by a motive power not entirely dependent with the moving body of the machine; and it consists, essentially, of two parallel body portions, axles at either end extending transversely across and through the body portions and bearing therein a set of gear-wheels rigid with the axles and within the frame, a set of gear-chains extending around the opposing pair of gear-wheels, cross-bars dependent from the chains, fingers extending from the cross-bars, a chute or channel-way below and dependent from the main frame, guides within the channel for the chains, cutting-knives rigid with the rear shaft and outside the frame, forks extending from the forward end and designed to cross between the fingers, a platform from the main frame, and at the forward end a power driving means supported on the platform, a belt connected with power driving means to the forward transverse shaft, an operating-handle extending rearwardly from the frame, a framework, a truck bearing from the aforesaid track, and means for pivotally working the main frame and its dependent members from the latter truck, all arranged and constructed as hereinafter more especially described.

Figure 1 is a perspective view of my complete invention. Fig. 2 is a detail sectional front elevation of the chute, showing the angle-bar guideways and the fingers dependent from the chains. Fig. 3 is a side sectional view as in Fig. 2, the section being taken in the plane X X'. Fig. 4 is a detailed perspective view of the link employed in the chain, from which the finger cross-bars are dependent. Fig. 5 is a detailed side elevation of the forward end of the main frame, showing the forks in operative position with the fingers. Fig. 6 is a detailed front view of the cross-truck and the hangers. Fig. 7 is a vertical section through the main frame forward of the rear shaft, showing the relative position on the shaft of the gears and the cutting-knife.

In the drawings like letters of reference indicate corresponding parts in each figure.

A represents the opposing longitudinal members of the main frame, bolted onto the other through an intervening strip of board A' or the like.

B B' are forward and rear shafts, respectively, extending across and through the frame and bearing therein.

C C represent a set of gear-wheels rigid with the shaft and placed within the longitudinal members of the frame. It will be understood that the board A' does not extend the full length of the members, but leaves an open space at either end therebetween, and therein the gears are placed.

D D' are upper and lower trestle-works secured forwardly and rearwardly to the frame and give increased rigidity and strength to the frame without unnecessary additional weight. Blocks $D^2$ are spaced along the longitudinals over which the trestle-rod passes. Dependent from the upper central opposing pair of such rods is a roller E', passing across the frame.

F F' are continuous linked chains passing around the similar laterally-displaced gears C and over the roller E'. Various links of the chain differ from the remainder in design in that they have wings extending from their outer faces. Such members are inserted in opposing pairs where required within the chains. Connected to such links are cross-bars G, which extend transversely beyond the chain for a purpose hereinafter explained. The method of securing the links to the cross-bars is simply by riveting through the wings $F^2$ to the bars. Extending upwardly and outwardly from the bars are fingers G', suitably placed along the bar.

$G^2$ is a chute or channel-way disposed below the main frame and supported by means of straps $G^3$, passing thereunder, and the width of the chute is that of the frame.

H represents angle-bars secured to the inner upright faces of the chute and form on either side therebetween a guideway for the extending ends of the cross-bars G, as mentioned above.

H' represents knives of any suitable construction, supported rigidly on the rear shaft B' and outside the frame.

I is a handle dependent from the main frame, having a cross-grip I' at its end for convenience in operating.

J represents forks extending inwardly and downwardly from the forward end of the frame and are designed to pass between the fingers in their rotation.

K is a platform supported by the longitudinals A A' and disposed forwardly.

K' is a motive power of any suitable form, preferably a gas-engine, and $K^2$ is a pulley on the shaft B, which is belted to the drive-wheel of the engine.

L L are tracks formed from the tubing and held horizontally by means of supports or legs L', secured at their upper ends to the cross-bars $L^2$, dependent from the track. The legs are suitably braced and spread to give ample bearing to the surface, and across the bottom is placed a plank $L^3$, which prevents the framework from sinking into the ground. The track is of a length equal to or greater than the over-all length of the frame supporting the gears and its operating-handle.

M is a second track, formed from opposing angle-bars bolted together by means of cross-bars M' at the ends and is subtended from the track L by a set of four rollers $M^2$, designed to operate on the pipe-track, the latter or angle-bar track extending on either side beyond the upper track and is substantially at right angles thereto.

N is an upper circular plate, supported by means of four rollers N', bearing upon the horizontal arms of the angle-bars composing the track.

$N^2$ is a lower circular plate flush with the upper plate and pivotally supported therefrom by a king-bolt O.

P is a rod fastened to the face of the platform K and passing transversely thereacross and extending on either side.

Q Q' represent a set of hangers looped around the extending ends of the rod P and with their extremities secured within or to the lower plate $N^2$.

If it is required, a canvas belt can be passed between the chains, being secured thereto by means of the rivets which hold the cross-plates G to the chain. Any suitable means may be employed for applying a brake to the rollers $M^2$, such being completely under the control of the operator.

In the actual machine the parts will be so arranged and the rod P so placed that the main frame and its dependent members will be practically balanced on either side of the rod P, as such allows easy manipulation for the operator. The double truck and the swivel-plate make it possible for the operator to swing or place his machine in any desired position.

The method of using the combined excavator and conveyer is as follows: The engine is started and the chains revolve, carrying the fingers with them and operating the knives. The operator lowers the rear end to the ground, and the knife H makes a cut which is scooped out by the fingers and carried into the chute, being deposited at the other end directly into a wagon or other such like conveyance.

The forks J serve only to clear or clean out any earth that tends to remain between the fingers. It will readily be seen that an excavation of considerable extent may be made with but a single position of the legs L', and no loss of time would be occasioned by double handling, as the wagons could be filled successively and drawn away. If desired, a second chute could be attached to form a continuation of the first, and by it the earth may be further distributed.

Although I show one form of drive, yet I wish it to be distinctly understood that a cable or rope may be used with pulleys or a rubber belt on spools and also that according to the requirements the fingers may be displaced and a solid scoop or blade or buckets may be substituted, the blades being more especially adapted to sandy soil and the buckets for the lifting of water, muddy soil, grain, coal, or the like. In these latter cases the forks J would be removed.

What I claim as my invention is—

1. In a device of the class described, the combination with the supporting track-frame of a truck, a frame dependent from the truck, a set of endless carrier-chains, a set of cutting-knives to the rear of the dependent frame, and a motive-power support at the forward end, means for imparting motion to the chain, a chute below the frame, and an operating-handle, as and for the purpose specified.

2. In a device of the class described, the combination with the track-frame of a double truck, a frame dependent and swiveled from the lower truck, set of gears disposed forwardly and rearwardly within the frame, endless chains engaging with the gears, carriers supported from the chains, cutting-knives dependent from the rear gear-shaft, a chute below the frame-guides for the chains within the chute, a motive power supported at the forward end of the frame, and a handle at the rear, and means for transmitting motion to the gears, as and for the purpose specified.

3. In a device of the class described, the combination with the supporting-truck of a lower frame, pivotally supported therefrom, sets of gears bearing forwardly and rearwardly in the frame, reinforcing trestle-work for the frame, a roller pivoted from the trestle-work, endless gear-chains passing over the roller and around the gears, plates disposed transversely across the frame and dependent from the gear-chains, fingers extending from the respective plates, a chute extending below the frame and supported therefrom, guides for the chains within the chute, forks extending inwardly and downwardly below, and a platform above to the forward end of the frame, a motive power upon the platform, means for communicating motion to the gears, and an operating-handle to the rear end of the frame, as and for the purpose specified.

4. In a device of the class described, the combination with the endless chain-belts, having sets of opposing flanged links therein, and the chute of a plate extending between and beyond the chains, and riveted to the flange, combined carrier and cutting fingers extending from the plates and angle-bars guideways, secured to the inner upright face of the chute, and designed to receive the extending ends of the cross-plates, as and for the purpose specified.

5. In a device of the class described, the combination with the upright end supports or legs of a longitudinal track, a lateral truck-track dependent therefrom, and a lower truck supported from the lateral track, hangers pivotally secured from the lower truck, a lower frame pivoted from the hangers, and substantially in equilibrium, and having endless chains with cutting-carrier thereon, cutting-knife to the rear, and dependent from the frame an operating-handle, a power mechanism, and means for transmitting motion to the chains, as and for the purpose specified.

ALEXANDER G. CAMERON.

Witnesses:
 M. A. SOMERVILLE,
 GERALD S. ROXBURGH.